Nov. 21, 1961

F. G. SIEGEL 3,010,070

OSCILLOSCOPE SWEEP CIRCUIT HAVING AN
ADJUSTABLE EXPANDED SWEEP

Filed May 31, 1960

INVENTOR
FLOYD G. SIEGEL

BY J. C. Chapman

ATTORNEY

United States Patent Office 3,010,070
Patented Nov. 21, 1961

3,010,070
OSCILLOSCOPE SWEEP CIRCUIT HAVING AN ADJUSTABLE EXPANDED SWEEP
Floyd G. Siegel, San Jose, Calif., assignor to Hewlett-Packard Company, Palo Alto, Calif., a corporation of California
Filed May 31, 1960, Ser. No. 32,711
10 Claims. (Cl. 328—185)

This invention relates to sweep circuits of the type used in oscilloscopes.

It is frequently desirable to display a recurring waveform on an oscilloscope at a very fast sweep rate in order to observe a portion of the waveform in detail. When the waveform under examination comprises a series of closely spaced events of short duration, such as a pluse train, increasing the sweep rate in order to observe one event in greater detail, prohibits observing the relationship of the selected event to the entire waveform.

It is a principal object of the present invention to provide a sweep generator which produces two different sweep rates during each recurrence of the displayed waveform.

It is another object of the present invention to provide a sweep generator which produces a substantially linear ramp voltage that changes abruptly in slope at a variable point along the ramp.

It is still another object of the present invention to provide a sweep generator which includes provisions for selecting the point at which the slope of the ramp changes abruptly.

In accordance with the illustrated embodiment of this invention, there are provided two ramp generators each generating a substantially linear ramp voltage, but of different slopes. The first ramp is started and applied to a utilization circuit such as a horizontal deflection circuit of an oscilloscope. The first ramp is compared with a reference voltage, and when the two voltages are equal, the second ramp is started. The first and second ramps are compared, and since the second ramp has a steeper slope, it will eventually overtake the first ramp. At that time, switching means are provided to apply the second ramp to the utilization circuit.

Other and incidental objects of the present invention will be apparent from a reading of this specification and an inspection of the accompanying drawing in which.

Figure 1:
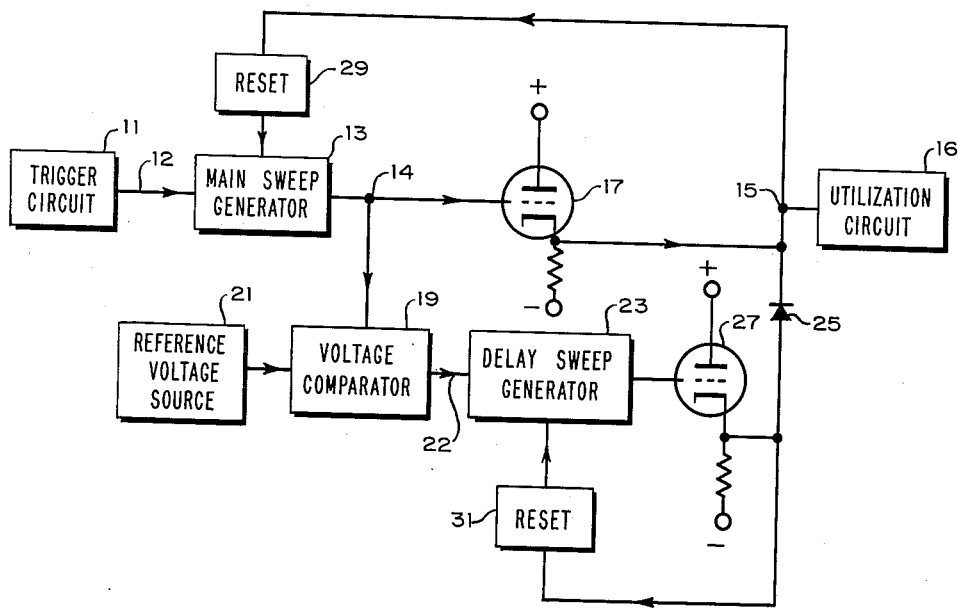
FIGURE 1 is a schematic diagram of an embodiment of the present invention.

Referring to FIGURE 1, the sweep circuit comprises a trigger circuit 11 connected through line 12 to a main sweep generator 13. The output terminal 14 of the main sweep generator is connected to the input terminal 15 of the utilization circuit 16 through a cathode follower 17. The output terminal 14 of the main sweep generator 13 is also connected to one input terminal of voltage comparator 19. A reference voltage source 21 is connected to the other input terminal of voltage comparator 19. The output of voltage comparator 19 is connected through line 22 to the delay sweep generator 23. The output terminal of the delay sweep generator 23 is connected to the input terminal 15 of the utilization circuit 16 through diode 25 and cathode follower 27. The main sweep generator 13 is provided with reset means 29, and the delay sweep generator 23 is provided with reset means 31.

The operation of the circuit is as follows: trigger circuit 11 initiates a pulse on line 12 for each recurrence of the waveform under examination. The trigger pulse applied to generator 13 initiates a substantially linear ramp voltage which is applied to the utilization circuit 16 through cathode follower 17. The output of generator 13 is also applied to one input terminal of the voltage comparator 19. A reference voltage 21 is applied to the other input terminal of voltage comparator 19, which reference voltage is adjusted to any value between the maximum and minimum values of the output wave of generator 13. At the instant when the two voltages applied to input terminals of voltage comparator 19 bear a predetermined relationship to each other, a signal such as a pulse is initiated on line 22. Thus, the pulse generated by the voltage comparator 19 is delayed relative to the pulse generated by trigger circuit 11 by the time required for the output waveform of generator 13 to attain the predetermined value of the reference voltage 21.

The signal that appears on line 22 initiates a substantially linear ramp voltage at the output of the delay sweep generator 23. The ramp voltage at the output of generator 23 has a slope which is steeper than the slope of the ramp voltage at the output of generator 13. The word "slope" is used herein to define the rate of change of voltage with time. The output of generator 23 is coupled to the input of the utilization circuit 16 through cathode follower 27 and diode 25. The diode 25 is connected so that it will be forward biased when the magnitude of the waveform of sweep generator 23 is greater than the magnitudes of the waveform of generator 13. When diode 25 conducts, the voltage at terminal 15 is substantially the output voltage of generator 23. Since the voltage that appears on the cathode of cathode follower 17 when diode 25 conducts exceeds the voltage that appears on the grid, tube 17 is cut off. Reset means 31 are provided to reset the delay sweep generator to its original value when the sweep voltage that appears at the output of cathode follower 27 attains a predetermined value, and reset means 29 is provided to reset the voltage of the main sweep generator 13 to its original value when the voltage appearing at terminal 15 attains a predetermined value, thereby terminating the sweep cycle.

Figure 2:
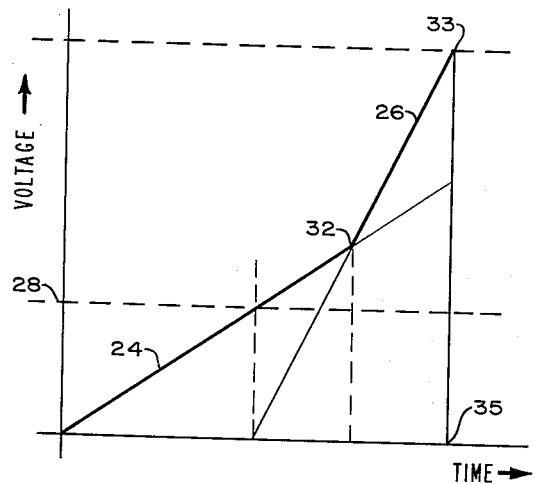
FIGURE 2 is a graph showing a waveform generated in accordance with the embodiment of FIGURE 1.

The resulting waveform, as shown in FIGURE 2, comprises a first ramp voltage 24, started at a time corresponding to the application of the first trigger pulse, which is compared with a reference voltage 28. At the instant when the ramp voltage 24 and the reference voltage 28 are equal, a second ramp voltage 26 is started. The second ramp voltage 26 is shown overtaking the first ramp voltage at point 32. Thus the point 32 at which the slope of the sweep voltage changes abruptly, is determined by three independently variable quantities, namely the slope of the first ramp voltage 24, the slope of the second ramp voltage 26 and the value of the reference voltage 28. When the second ramp voltage attains a predetermined value 33, the two ramp voltages are reset to their starting values 35.

Thus it can be seen that the voltage appearing at terminal 15 is a ramp voltage containing a point of discontinuity at which the rate of change of voltage with time changes from one substantially constant value to a relatively higher value in an abrupt manner. This voltage, when applied to a utilization circuit such as a horizontal deflection circuit of an oscilloscope, provides a sweep for the displayed waveform which changes in rate at a predetermined point for each recurrence of the waveform. Also, a sweep voltage as previously described provides means to observe a portion of the displayed waveform on one time scale and a selected portion of the displayed waveform on an expanded time scale, thereby permitting detailed observation of a selected portion of the waveform and its relationship to the composite display.

I claim:

1. A sweep circuit comprising means to generate a first ramp voltage starting from a reference potential and having a substantially linear slope, a reference voltage source, means to compare said first ramp and said reference voltage and to produce an output signal when said first ramp voltage bears a predetermined relationship to said reference voltage, means responsive to said output signal to generate a second ramp voltage starting from said reference potential and having a substantially linear slope, said second ramp voltage having a greater slope than said first ramp voltage, a utilization circuit, means to apply one of said ramp voltages to said utilization circuit, and switching means to apply the other of said ramp voltages to said utilization circuit when said ramp voltages bear a predetermined relationship to each other.

2. A sweep circuit comprising means to generate a first ramp voltage starting from a reference potential and having a substantially linear slope, a reference voltage source, means to compare said first ramp and said reference voltage and to produce an output signal when said first ramp voltage equals said reference voltage, means responsive to said output signal to generate a second ramp voltage starting from said reference potential and having a substantially linear slope, said second ramp voltage having a greater slope than said first ramp voltage, a utilization circuit, means to apply one of said ramp voltages to said utilization circuit, and switching means to apply the other of said ramp voltages to said utilization circuit when said ramp voltages bear a predetermined relationship to each other.

3. A sweep circuit comprising means to generate a first ramp voltage starting from a reference potential and having a substantially linear slope, a reference voltage source, means to compare said first ramp and said reference voltage and to produce an output signal when said first ramp voltage bears a predetermined relationship to said reference voltage, means responsive to said output signal to generate a second ramp voltage as starting from said reference potential and having a substantially linear slope, said second ramp voltage having a greater slope than said first ramp voltage, a utilization circuit, means to apply one of said ramp voltages to said utilization circuit, and switching means to apply the other of said ramp voltages to said utilization circuit when said ramp voltages are equal.

4. A sweep circuit comprising means to generate a first ramp voltage starting from a reference potential and having a substantially linear slope, a reference voltage source, means to compare said first ramp and said reference voltage and to produce an output signal when said first ramp voltage equals said reference voltage, means responsive to said output signal to generate a second ramp voltage starting from said reference potential and having a substantially linear slope, said second ramp voltage having a greater slope than said first ramp voltage, a utilization circuit, means to apply the first ramp voltage to said utilization circuit, and switching means to apply the second ramp voltage to said utilization circuit when said ramp voltages are equal.

5. A sweep circuit comprising means to generate a first ramp voltage starting from a reference potential and having a substantially linear slope, a reference voltage source, means to compare said first ramp and said reference voltage and to produce an output signal when said first ramp voltage bears a predetermined relationship to said reference voltage, means responsive to said output signal to generate a second ramp voltage starting from said reference potential and having a substantially linear slope, said second ramp voltage having a greater slope than said first ramp voltage, a utilization circuit, means including a first cathode follower to apply said first ramp voltage to said utilization circuit, a second cathode follower connected to receive the second ramp voltage, a unidirectional conducting element connected to apply the output of the second cathode follower to said utilization circuit, means to terminate said first ramp voltage when the voltage at the input of said utilization circuit attains a predetermined value, and means to terminate said second ramp voltage when the magnitude thereof attains a predetermined value.

6. A sweep circuit comprising means to generate a first ramp voltage starting from a reference potential and having a substantially linear slope, a reference voltage source, means to compare said first ramp and said reference voltage and to produce an output signal when said first ramp voltage equals said reference voltage, means responsive to said output signal to generate a second ramp voltage starting from said reference potential and having a substantially linear slope, said second ramp voltage having a greater slope than said first ramp voltage, a utilization circuit, means including a first cathode follower to apply said first ramp voltage to said utilization circuit, a second cathode follower connected to receive the second ramp voltage, a unidirectional conducting element connected to apply the output of the second cathode follower to said utilization circuit, means to terminate said first ramp voltage when the voltage at the input of said utilization circuit attains a predetermined value, and means to terminate said second ramp voltage when the magnitude thereof attains a predetermined value.

7. The sweep circuit of claim 5 wherein the said unidirectional conducting element is a diode so connected as to be forward biased when the magnitude of said second ramp voltage exceeds the magnitudes of said first ramp voltage.

8. The sweep circuit of claim 6 wherein the said unidirectional conducting element is a diode so connected as to be forward biased when the magnitudes of said second ramp voltage exceeds the magnitudes of said first ramp voltage.

9. An oscilloscope sweep circuit comprising means to generate a first ramp voltage starting from a reference potential and having a given slope, means to generate a second ramp voltage starting from said reference potential and having a greater slope than said first ramp voltage, a utilization circuit, means to apply said first ramp voltage to said utilization circuit, and gating means to end the application of said first ramp voltage to said utilization circuit and start the application of said second ramp voltage to said utilization circuit, said gating means becoming effective when the magnitude of said second ramp voltage overtakes the magnitude of said first ramp voltage.

10. An oscilloscope sweep circuit comprising means to generate a first ramp voltage starting from a reference potential and having a given slope, means to generate a second ramp voltage starting from said reference potential at a time that is delayed from the start of the first ramp voltage, said second ramp voltage having a greater slope than said first ramp voltage, a utilization circuit, means including a first cathode follower to apply said first ramp voltage to said utilization circuit, a second cathode follower connected to receive the second ramp voltage, and gating means including the first and second cathode followers and a unidirectional conduction element connecting the outputs of said cathode followers, said gating means being so connected that the application of said first ramp voltage to the utilization circuit ends and the application of said second ramp voltage to the utilization circuit begins when the magnitude of said second ramp voltage overtakes the magnitude of said first ramp voltage.

References Cited in the file of this patent
UNITED STATES PATENTS
2,849,609    Casey  ---------------- Aug. 26, 1958